(12) United States Patent
Blair et al.

(10) Patent No.: US 8,336,149 B2
(45) Date of Patent: Dec. 25, 2012

(54) FIBER OPTIC COMPONENT CLEANING DEVICE WITH GROOVED PLATEN

(75) Inventors: Paul M. Blair, Jonesboro, GA (US); Edward J. Forrest, Jr., Marietta, GA (US)

(73) Assignee: Illinois Tool Works Inc., Glenview, IL (US)

( * ) Notice: Subject to any disclaimer, the term of this patent is extended or adjusted under 35 U.S.C. 154(b) by 979 days.

(21) Appl. No.: 12/370,067

(22) Filed: Feb. 12, 2009

(65) Prior Publication Data

US 2010/0199452 A1 Aug. 12, 2010

(51) Int. Cl.
*B08B 1/00* (2006.01)
*G02B 6/36* (2006.01)

(52) U.S. Cl. ............ 15/104.001; 15/209.1; 15/210.1

(58) Field of Classification Search ......... 15/208–210.1, 15/104.001
See application file for complete search history.

(56) References Cited

U.S. PATENT DOCUMENTS

| | | | |
|---|---|---|---|
| 5,325,452 A | 6/1994 | Stein et al. | |
| 5,918,341 A * | 7/1999 | Hale | 15/209.1 |
| 6,648,980 B2 * | 11/2003 | Childers et al. | 134/6 |
| 6,854,152 B2 | 2/2005 | Loder et al. | |
| 6,865,770 B2 | 3/2005 | Forrest | |
| 7,552,500 B2 | 6/2009 | Forrest, Jr. | |
| 2006/0107479 A1 * | 5/2006 | Forrest, Jr. | 15/210.1 |

OTHER PUBLICATIONS

International Search Report and Written Opinion of the International Searching Authority in connection with PCT/US2009/069923 on Mar. 24, 2010.

* cited by examiner

*Primary Examiner* — Laura C Guidotti
(74) *Attorney, Agent, or Firm* — Levenfeld Pearlstein, LLC

(57) ABSTRACT

A cleaning device for cleaning multiple types of fiber optic connectors includes a container having an opening in a face formed in a side of the container and a plurality of discrete soft, work surfaces on a face of the container. The surfaces are configured as a pair of outwardly disposed surfaces having a width and a pair of inwardly disposed surfaces having a width that is less than the width of the outwardly disposed surfaces. The surface are parallel to each other. Gaps are disposed between each of the adjacent work surfaces. Each of the gaps has a width. A plurality of cleaning wipes are located inside the container. The wipes are fed from the inside of the container through the opening and placed on the work surface for cleaning the fiber optic connector. The wipes provide indication that they have been used.

17 Claims, 3 Drawing Sheets

FIBER OPTIC COMPONENT CLEANING DEVICE WITH GROOVED PLATEN

BACKGROUND OF THE INVENTION

The present invention is directed to a fiber optic component cleaning device. More particularly, the present invention pertains to a fiber optic component cleaning device that is configured for thoroughly cleaning a wide variety of fiber optic connectors.

Fiber optic transmission rates have increased from one gigabyte per second to a contemporary standard of ten gigabytes per second. Several networks predict transmission rates will reach forty gigabytes per second in the near future. Researchers are working to achieve transmission rates on the order of petabytes and terabytes per second.

In order to achieve, maintain, and even surpass these transmission rates, the transmission media (e.g., fiber optic conductors), must be fabricated and maintained to exacting standards and tolerances. During fabrication and manufacturing, and installation and testing, fiber optic component end faces frequently become contaminated with dirt, dust, oil, grease, and other debris. Cleaning the end faces preserves the accuracy of these very high-speed transmissions. In addition, the end faces of the conductors must be free of scratches, burrs, and the like to maintain the standards necessary for these high transmission rates. Moreover, soils and improper cleaning can also damage end face polish.

Various types of fiber optic connectors are known. Some of these connectors permit the joining of single optical fibers. Other types of connectors more efficiently permit the joining or connecting of multiple fibers in a single physical connector body. The various types of connectors as such have differing physical structures, connector configurations, components and the like. This can require that maintenance personnel and installers carry with them multiple types of cleaning devices.

Moreover, the various parts of the connectors, including the ferrule and chamfer also require cleaning so as to not contaminate the end face and other connector portions.

Because of the differing structures, the requirements and tools for cleaning the connector also vary. Known cleaning devices are those disclosed in Forrest, U.S. Pat. Nos. 7,216,760 and 6,865,770, and U.S. Published patent application Publication No. 2006/0107479 all of which are commonly assigned with the present invention and are incorporated herein by reference. While these all work well for general and in some cases, specific applications, there is still a lack of ability for a single cleaning device to be used to efficiently clean a wide variety of known (and yet to be designed) connectors.

Accordingly, there exists a need for a fiber optic cleaning device that can be used to effectively clean a wide variety of connector types having different structures and requirements. Desirably, such a cleaning device leaves no residue on a connector, and cleans all of the portions of the connector including the end face, ferrule, chamfer and other parts of such a connector.

BRIEF SUMMARY OF THE INVENTION

A cleaning device is configured for cleaning a wide variety of fiber optic connectors. The cleaning device includes a container having an opening in a face formed in a side of the container and a plurality of discrete soft, work surfaces on a face of the container. The surfaces are configured having a pair of outwardly disposed surfaces having a width and a pair of inwardly disposed surfaces having a width that is less than the width of the outwardly disposed surfaces. The surfaces are parallel to each other. Gaps are disposed between each of the adjacent work surfaces, the gaps each have.

A plurality of cleaning wipes is located inside the container. The wipes are fed from the inside of the container through the opening and placed on the work surface for cleaning the fiber optic connector. Advantageously, such a cleaning device permits the use of a single device for cleaning a wide variety of types of connectors, and eliminates the need for maintenance/installation personnel to carry different types of cleaning device for the different types of connectors that may be encountered in an installation.

In a present device the width of the outwardly disposed surfaces is equal and the width of the inwardly disposed surfaces is equal and the outwardly disposed surfaces are wider than the inwardly disposed surfaces. In addition, the width of each of the gaps is equal. Preferably, the width of the outwardly disposed surfaces is about $11/32$ inch, the width of inwardly disposed surfaces is about $1/8$ inch and the width of each gap is about $5/32$ inch. The height of each of the surfaces is equal to a height of each of the others of the surfaces, and is preferably about $3/16$ inch.

In a present device the work surfaces are disposed on a resilient work surface extending over substantially the face of the container. Preferably, the works surfaces are formed of a non-linting material, such as a tight, closed cell material, or a covered open cell matrix, for example, neoprene.

The container can be formed of paperboard, cardboard, molded plastic, and/or electrostatic discharging material. In a present embodiment, the face on which the plurality of discrete work surfaces is located on a side adjacent to the side in which the opening of the container is formed.

The cleaning wipes can be placed on a roll inside of the container. The cleaning wipes can be detachable from adjacent cleaning wipes, as by perforations, for easy disposal.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
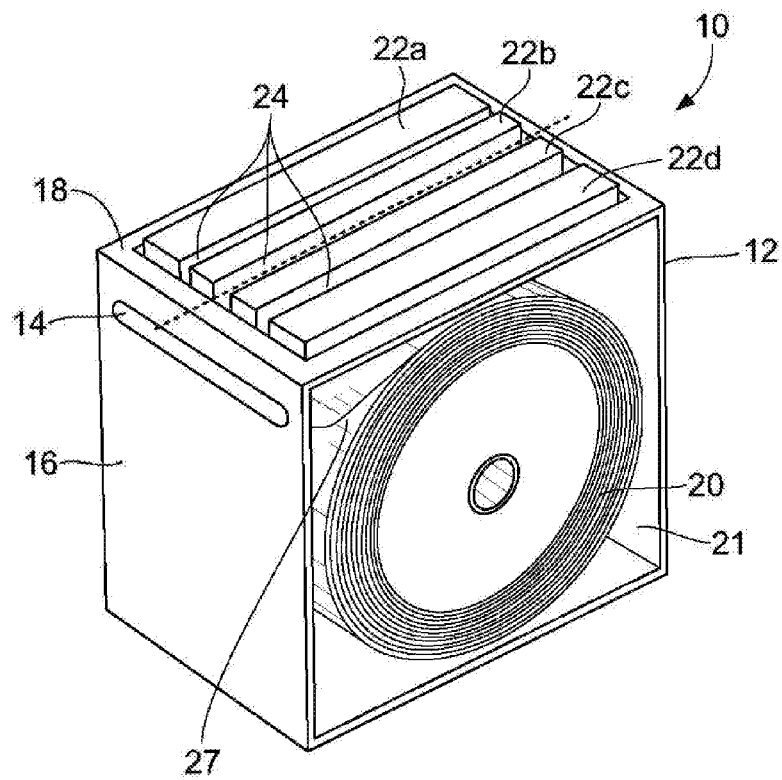
FIG. 1 is a perspective illustration of a fiber optic connector cleaning device having a grooved platen embodying the principles of the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment, size or shape illustrated.

It should be further understood that the title of this section of this specification, namely, "Detailed Description Of The Invention", relates to a requirement of the United States Patent Office, and does not imply, nor should be inferred to limit the subject matter disclosed herein.

Referring to the figures and in particular FIG. 1 there is shown a fiber optic component cleaning device 10 in accordance with the principles of the present invention. The cleaning device includes a container 12, having an opening 14 formed in a side 16 (or top 18) panel thereof, and a plurality of soft cleaning wipes 20 located inside 21 the container.

The cleaning device 10 includes a plurality of large raised work surfaces 22a-d (collectively ) on the face (as illustrated, the top 18) of the container 12. The work surfaces 22a-d are formed as discrete, elongated, narrow strips (having the appearance of stripes) positioned on the container face.

The work surfaces (strips) 22a-d are provided in a specific width $w_{22a}$-$w_{22d}$ and gap 24 spacing configuration. In the illustrated cleaning device 10, there are four strips 22a-d that are positioned on a base platen 26. The strips 22 are symmetrically positioned on the platen 26 and container face 18. There are two outer strips (22a, 22d) that are wide (to, for example, accommodate a known FTTH connector) and two center strips (22b, 22c) that are narrower (to, for example, accommodate a known male M connector) than the outer strips 22a, 22d.

The outer strips 22a, d are 11/32 inch wide and the inner strips 22b, c are 4/32 (1/8) inch wide. The spaces or gaps 24 between the strips 22a-d each has a width $w_{24}$ of about 5/32 inch (to, for example, accommodate a known SC or LC connector). The total width of the strips 22a-d and gaps 24 is about 44/32 (1.375 inches). The length L of the strips 22a-d (and thus the platen 26) is about 2¾ (2.75) inches. It will be appreciated that connectors other than those specifically noted can be cleaned using the present device 10.

In a present cleaning device 10, the strips 22a-d reside on the resilient base platen 26 and are formed integral therewith. This is an optional configuration—that is, the strips 22a-d can be disposed directly on the device housing or container 12. In the present embodiment, the strips 22a-d and base platen 26 are formed as a single member and the gaps 24 are cut into the member. Alternately, the member can be coextruded (extruded with the strips 22a-d on the platen 26). In this manner, the size and spacing can be well controlled as can the formation/fabrication of the cleaning surface.

The cleaning wipes 20 are fed from the inside of the container 12 through the opening 14, and placed on the work surfaces 22a-d for cleaning. In the illustrated embodiment, the wipes 20 spool from the outside of the roll and are fed onto the cleaning surface 22a-d. Perforations 27 transverse to the wipe feed direction allow used wipes 20 to be torn from the roll and discarded.

In the present cleaning device 10, the container 12 is shaped as a rectangular box. The container 12 can be formed of paperboard, cardboard, molded plastic or other suitable material. The container 12 can be formed from an electrostatic discharging material, as desired. As will be recognized by those skilled in the art, such a container 12 may be made to be disposable or refillable with wipes 20.

The opening 14 has a slot shape and the work surfaces 22a-d are located on a panel (e.g., the top 18) adjacent to that (the side 16) in which the opening 14 is formed. In a current embodiment, the work surfaces 22a-d are formed from a non-linting material. Preferably, the non-linting material used for the work surfaces 22a-d is a tight, closed cell material. An exemplary tight, closed cell material is the commonly available material neoprene.

Alternately, the work surfaces 22a-d can be formed from, for example, Buna-N (nitrile butyl rubber) vinyl or a like soft, resilient polymer. Essentially any soft, resilient material can be used. Desirable characteristics for the work surface 22a-d include liquid impermeability and chemical/solvent resistance. To this end, the work surfaces 22a-d can be formed from a soft, resilient material having a protective layer adhered thereto or formed thereon, such as by forming a coextruded material or film.

Figure 4:
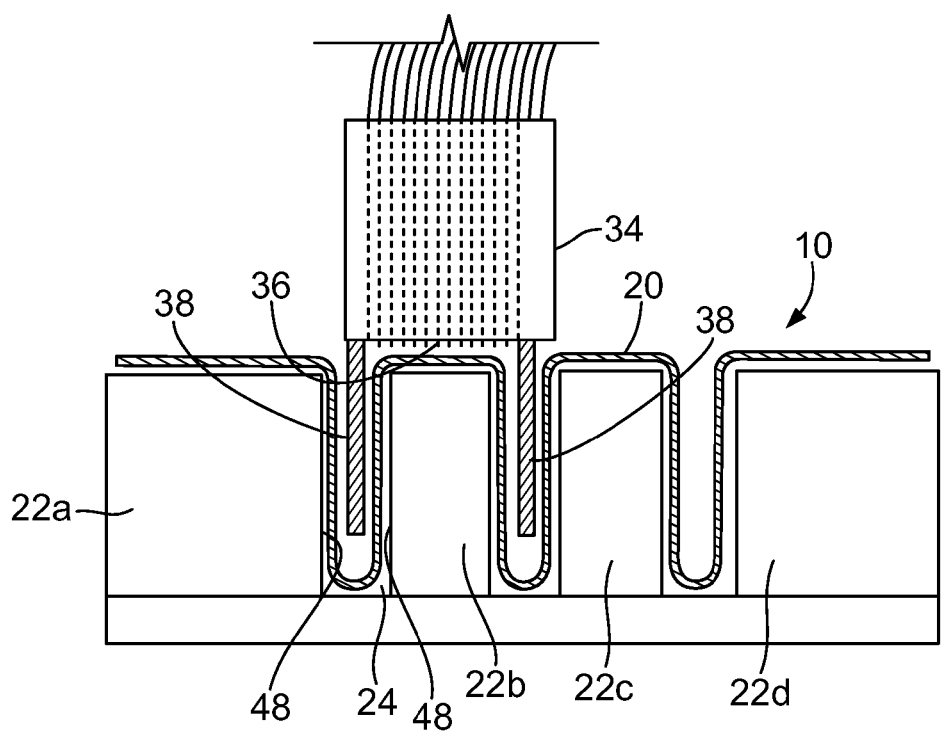
FIG. 4 is a side view of the device illustrated with an exemplary MT (multiple termination) connector thereon.
Figure 5:
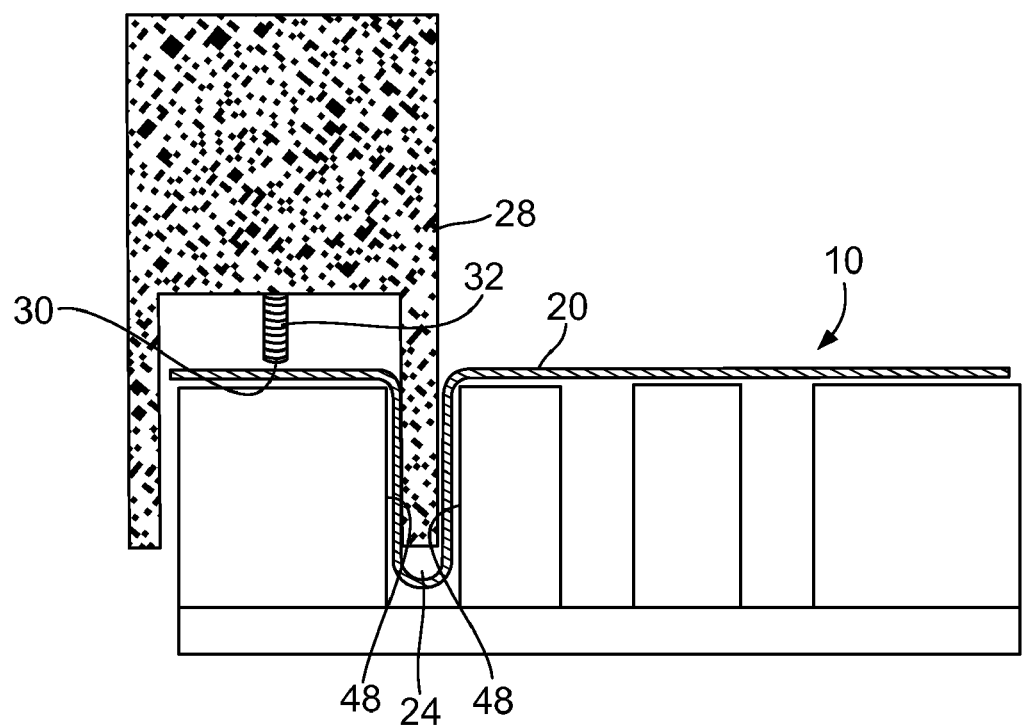
FIG. 5 is a side view of the device illustrated with an exemplary FTTH connector thereon.
Figure 6:
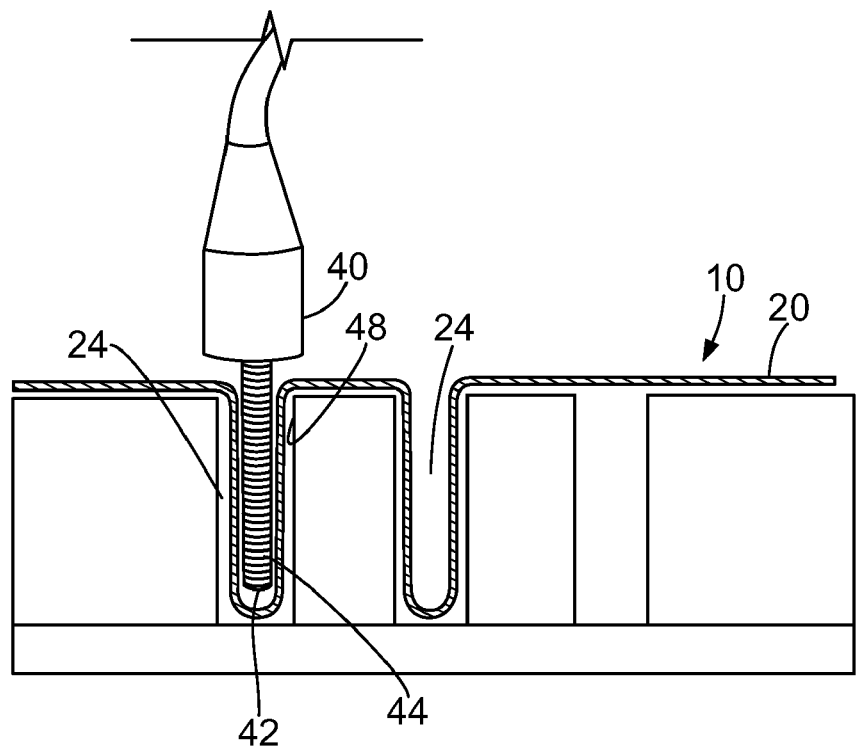
FIG. 6 is a side view of the device illustrated with an exemplary SC, LC or APC connector thereon.

The present device 10 is configured for use with a host of different types (configurations) of connectors. For example, as seen in FIG. 5 an FTTH connector housing 28 (manufactured by Coming) is illustrated positioned on the cleaning device 10 for wiping the fiber end face 30, as well as cleaning the ferrule 32 and other parts of the connector. As seen in FIG. 4, the male side of an MT connector body 34 is illustrated positioned on the cleaning device 10 for wiping the multiple fiber end faces 36, as well as cleaning the alignment pins 38 and other parts of the connector. And, FIG. 6 illustrates an exemplary SC, LC, or APC connector housing 40 positioned on the cleaning device 10 for wiping the fiber end face 42 and ferrule 44.

Figure 2:
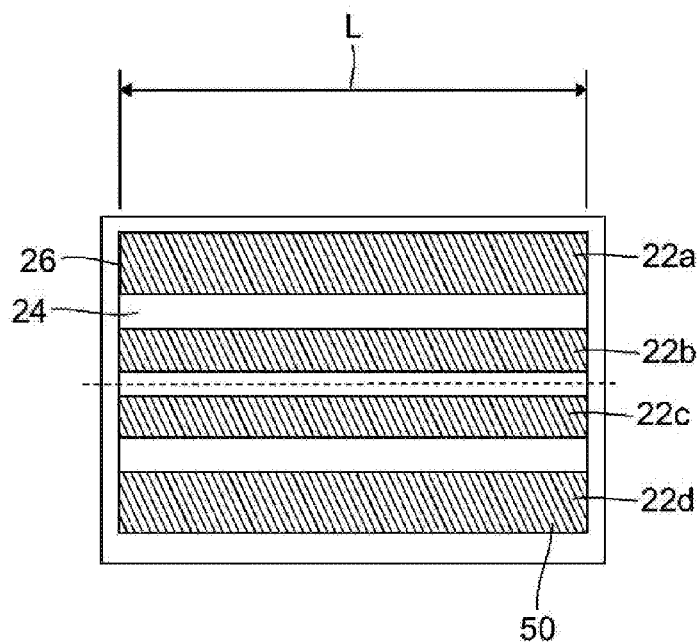
FIG. 2 is a top view of the cleaning device.
Figure 3:
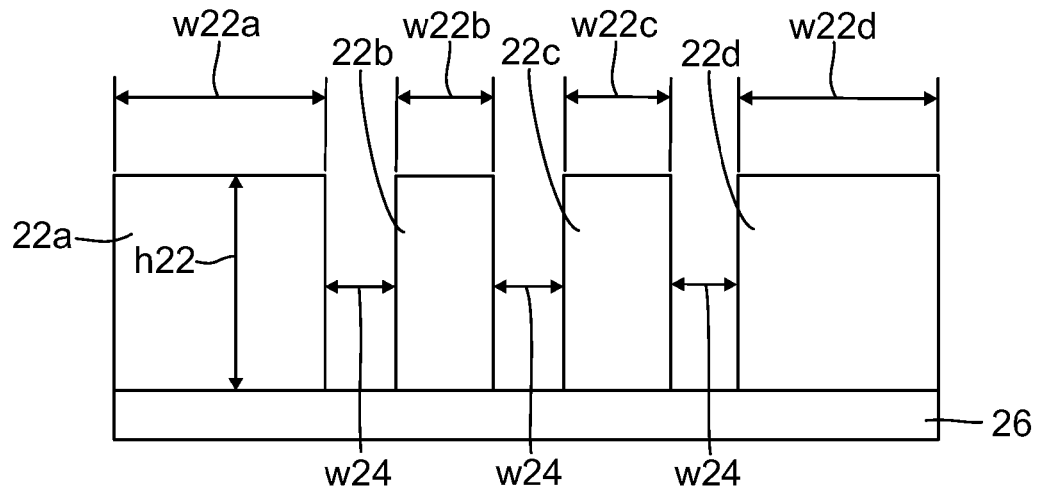
FIG. 3 is a side view of the device.

In use, a cleaning wipe 20 is drawn through the opening 14 in the container 12 and is placed on the work surfaces 22a-d. A selected fiber optic component is drawn over the wipe 20. As seen in FIGS. 4-6, as the connector is drawn along the wipe 20, along the length of the cleaning surfaces 22a-d, connector pins, ferrules or guide structures are drawn through the gaps or spaces 24 with the wipe 20 between the connector part being cleaned and the wall or walls 48 (see FIGS. 4-6) of the respective strip or strips 22a-d. This aligns the connector to assure a good cleaning stroke as the connector is drawn along the wipe 20. The height or depth $h_{22}$ (see FIG. 2) of the strips 22a-d also assures good contact between the end faces and/or ferrules or other components and the wipes 20 to assure good cleaning occurs. It will be appreciated from the figures that as the component is drawn through the gap 24 the wipe 20 is likewise pulled into the gap 24 and is taut or under slight tension by virtue of riding up the inner walls 48 of the respective (and adjacent) strips 22a-d. This further assures good contact between the connector part (particularly the end faces) and the wipes 20.

In addition, the action of drawing the connector along the wipe 20, through the gap 24 tends to mark or crease the wipe 20 which provides indication that the wipe 20 has been used. Accordingly, this can be used by the user as a reminder to change the wipe 20 surface.

Alternatively, the wipes 20 may be wetted, for example at one end (along the length L of the surfaces 22a-d, e.g. as at 50 in FIG. 2), so that the connector may be drawn from a wet portion to a dry portion of the wipe 20. The wet portion may be wetted by spraying a solvent onto the wipe 20, and cleaning accomplished by moving the connector from the wet portion to the dry portion in an integrated procedure.

In addition, the platen 26 and surfaces 22 can include indicia (such as notes, sentences, picture, figures or the like) so show how the device is used and on which surfaces, what types of connectors should be cleaned. The platen 26 and surfaces 22 can also be used to carry advertising and the like. Also, the configuration of the platen 26 and surfaces 22 can be mimicked on a different side of he container 12 and instructions provided thereon.

All patents referred to herein, are hereby incorporated herein by reference, whether or not specifically do so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A cleaning device having a grooved platen configured for cleaning multiple types of fiber optic connector, comprising:
   a container;
   at least four discrete soft, work surfaces on a face formed of a side of the container, the surfaces being configured having a pair of outer surfaces having a width and a pair of inner surfaces having a width that is less than the width of the outer surfaces, the outer surfaces and the inner surfaces being parallel to each other;
   gaps disposed between each of the adjacent work surfaces, the gaps each having a width; and
   a plurality of cleaning wipes located inside the container, the wipes being fed from the inside of the container and placed on the work surfaces for cleaning.

2. The device in accordance with claim 1 wherein the width of each of the gaps is equal.

3. The device in accordance with claim 1 wherein a height of each of the surfaces is equal to a height of each of the others of the surfaces.

4. The device in accordance with claim 1 wherein the width of the outer surfaces is about $11/32$ inch and the width of each of the inner surfaces is about $1/8$ inch.

5. The device in accordance with claim 4 wherein the width of each gap is about $5/32$ inch.

6. The device in accordance with claim 1 wherein the plurality of discrete work surfaces are disposed on a resilient work surface extending over substantially the face of the container.

7. The device in accordance with claim 1 wherein the plurality of discrete work surfaces are formed of a non-linting material.

8. The device in accordance with claim 7 wherein the plurality of discrete work surfaces are formed of a tight, closed cell material, or a covered open cell matrix.

9. The device in accordance with claim 8 wherein the plurality of discrete work surfaces are formed of neoprene.

10. The device in accordance with claim 1 wherein the container is formed of paperboard, cardboard, molded plastic, and/or electrostatic discharging material.

11. The device in accordance with claim 1 wherein the face on which the plurality of discrete work surfaces are located on a side adjacent to the side in which the opening of the container is formed.

12. The device in accordance with claim 1 wherein the plurality of cleaning wipes is placed on a roll.

13. The device in accordance with claim 12 wherein each of the plurality of cleaning wipes is detachable from adjacent cleaning wipes.

14. The device in accordance with claim 1 wherein the wipe indicates when it has been used.

15. The device in accordance with claim 1 including an opening in a face formed in a side of the container for dispensing the wipes from the inside of the container and positioning the wipes on the work surfaces.

16. The device in accordance with claim 1 wherein the work surfaces include indicia thereon.

17. A cleaning device having a grooved platen configured for cleaning multiple types of fiber optic connector, comprising:
   a container;
   a plurality of discrete soft, work surfaces on a face formed of a side of the container, the surfaces being configured having a pair of outer surfaces having a width and a pair of inner surfaces having a width that is less than the width of the outer surfaces, the outer surfaces and the inner surfaces being parallel to each other, wherein the widths of the outer surfaces are equal and the widths of the inner surfaces are equal;
   gaps disposed between each of the adjacent work surfaces, the gaps each having a width; and
   a plurality of cleaning wipes located inside the container, the wipes being fed from the inside of the container and placed on the work surfaces for cleaning.

* * * * *